US008375454B2

(12) United States Patent
Sun

(10) Patent No.: US 8,375,454 B2
(45) Date of Patent: Feb. 12, 2013

(54) METHOD FOR LOCKING AN APPLICATION PROGRAM

(75) Inventor: Xiaoyu Sun, Guangdong Providence (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 405 days.

(21) Appl. No.: 12/864,936

(22) PCT Filed: Dec. 29, 2008

(86) PCT No.: PCT/CN2008/073806
§ 371 (c)(1),
(2), (4) Date: Jul. 28, 2010

(87) PCT Pub. No.: WO2009/094886
PCT Pub. Date: Aug. 6, 2009

(65) Prior Publication Data
US 2011/0010550 A1    Jan. 13, 2011

(30) Foreign Application Priority Data

Jan. 28, 2008 (CN) .......................... 2008 1 0006716

(51) Int. Cl.
*G06F 7/04* (2006.01)
*G06F 17/30* (2006.01)
*H04N 7/16* (2011.01)
(52) U.S. Cl. .......... 726/26; 707/783; 707/788; 707/785; 726/30; 726/27; 726/1; 726/2; 726/16; 726/21; 726/33; 713/165; 713/182; 713/183; 713/184; 713/164; 713/167; 455/410; 455/411; 455/26.1; 717/120; 717/121
(58) Field of Classification Search ............... 713/171
See application file for complete search history.

(56) References Cited

U.S. PATENT DOCUMENTS

2008/0006685 A1* 1/2008 Rackley, III et al. ......... 235/379
2008/0046583 A1* 2/2008 Rao ............................... 709/230

FOREIGN PATENT DOCUMENTS

| CN | 1786864 A | 6/2006 |
| CN | 1893713 A | 1/2007 |
| CN | 101226575 A | 7/2008 |
| JP | 2007332695 A | 12/2007 |

OTHER PUBLICATIONS

International Search Report dated Apr. 9, 2009 issued in International Application No. PCT/CN2008/073806.

* cited by examiner

*Primary Examiner* — Nathan Flynn
*Assistant Examiner* — Bryan Wright
(74) *Attorney, Agent, or Firm* — Scully, Scott, Murphy & Presser, P.C.

(57) ABSTRACT

A method for locking the application program includes: when running a application program stored in a terminal, it judges whether a first unlocking key of the application program exists in the terminal; in the case that the first unlocking key does not exist, the terminal generates and stores the first unlocking key, and sends it to a device; judging whether the device has locked the application program, in the case that the result of judgment is no, proceeding to the first step, otherwise proceeding to the second step: the first step, the device locks the application program, generates a second unlocking key, and notifies the second unlocking key to a user, proceeding to the second step; the second step, performing the authentication process for the user; in the case that the first unlocking key exists in the terminal, the first unlocking key is sent to the device, judging whether the device has locked the application program or not, if not, proceeding to the third step, otherwise proceeding to the forth step; the third step, the device locks the application program, generates the second unlocking key and notifies the second unlocking key to the user, proceeding to the forth step; the forth step, performing the verification process.

15 Claims, 3 Drawing Sheets

METHOD FOR LOCKING AN APPLICATION PROGRAM

FIELD OF THE INVENTION

The present invention relates to the communication field, and more particularly to a method for locking an application program.

BACKGROUND OF THE INVENTION

At present, when an application software (program) corporation performs an intellectual property rights protection for its software, a commonly used important method is to add the verification for software serial number during the use of software. In practical applications, however, the software serial number is easily to be divulged, and thus such a common protection manner can not achieve a good protection effect.

The application software of mobile terminal is also intellectual property rights that should be protected, and more importantly, if the software of mobile terminal is not protected, it is possible to cause an economic loss to the user holding the terminal. At present, there is no need to input a serial number for the PC side software of a communication terminal, mainly because that most current mobile terminals need a subscriber identity module (SIM) card or user identity module (UIM) card, and the SIM card itself provides a personal identification number (PIN) verification and a PIN unlocking key (PUK) verification, which may achieve the effect of protection. However, the disadvantage of such a protection solution is that, a user would not open a PIN code option so that a password should be inputted each time when the PC side software is started; in this case, other users may perform network link embezzlement very easily once the SIM card and the UIM card are lost together, so as to bring economic losses to the original users.

Along with the development of technology, the worldwide interoperability for microwave access (WiMAX) technology is stepping into our lives. In the WiMAX technology, the authentications of SIM card and UIM card will be replaced by the user authentication of WiMAX; that is to say, a terminal user may connect to the network only with a user name and a password; in this case, the case of automatic connection is also included, i.e. a terminal device will perform automatic authentication according to the stored user name and password once a terminal device is inserted. For example, when a WiMAX data card is in the automatic connection mode, if it occurs that a terminal is lost, other illegal users may perform an illegal connection by using the application downloaded from the network and the stolen serial number or by faking an application of the device directly; if the illegal user has a legal software and serial number, he may also embezzle others devices, so as to bring economic losses to the embezzled users. For the above case, performing locking protection for the application software becomes more important.

However, it is so far not proposed any scheme capable of providing an effective protection for the software (application program).

SUMMARY OF THE INVENTION

The present invention is provided in view of the problem that an effective protection can not be provided for the software (application program) in the prior art; for this reason, the primary objective of the present invention is to provide an improved scheme for locking the application program, so as to remedy the problem existing in the protection for the application program in the prior art.

To achieve the above objectives, according to one aspect of the present invention, a method for locking an application program is provided. The method is applied in a communication environment including a terminal and a device connected to the terminal.

According to the present invention, the method for locking an application program includes: judging whether a first unlocking key of the application program exists in the terminal when running the application program stored in the terminal;

generating and storing, by the terminal, the first unlocking key in the case that the first unlocking key does not exist in the terminal, and sending the generated first unlocking key to the device; judging whether the device has locked the application program, proceeding to step one in the case that the device has not locked the application program; otherwise proceeding to step two;

step one: locking, by the device, the application program, generating a second unlocking key, notifying the second unlocking key to the user, and proceeding to step two;

step two: performing an authentication process for the user using the second unlocking key;

sending the first unlocking key to the device in the case that the first unlocking key exists in the terminal, judging whether the device has locked the application program, proceeding to step three in the case that the device has not locked the application program; otherwise, proceeding to step four;

step three: locking, by the device, the application program, generating the second unlocking key, notifying the second unlocking key to the user, and proceeding to step four;

step four: performing a verification process for the user using the second unlocking key.

The authentication process includes: comparing the second unlocking key inputted by the user with the second unlocking key of the device, and judging the authentication for the user is passed in the case that the compared result is that the two match with each other.

Moreover, in the case that the authentication for the user is passed, it is allowed for the user to relock the device and the application program.

On the other hand, in the case that the number of times of failed authentication for the user reaches a predetermined number, the device is disenabled for a preset time.

In addition, the second unlocking key is generated according to a device vendor secret key, a serial number of application program and the unique identifier of device; the first unlocking key is the second unlocking key encrypted in a predetermined manner.

In addition, the verification process may include: decrypting the first unlocking key according to a predetermined manner, comparing the result of the decryption with the second unlocking key; in the case that the compared result is that the two match with each other, judging that the verification for the user is passed.

In addition, the terminal may be a computer.

To achieve the above objectives, according to another aspect of the present invention, a terminal is provided.

According to the present invention, the terminal includes: a first judging module for judging whether a first unlocking key of a application program exists in the terminal when running the application program stored in the terminal; a generating module for generating and storing the first unlocking key in the case that the first judging module judges that the first unlocking key does not exist in the terminal; a sending module for sending the generated first unlocking key to a device;

a second judging module for judging whether the device has locked the application program; an authentication processing module for performing an authentication process for a user using a second unlocking key in the case that the result of judgment of the second judging module is yes; a verification processing module for performing a verification process using the second unlocking key in the case that the result of judgment of the second judging module is yes.

Preferably, the terminal is a computer.

Through the above technical scheme of the present invention, the problem that an effective protection is not provided for the software (application program) in the prior art is solved by locking the application program, to prevent an illegal user from performing the network link embezzlement via the PC side software, providing an effective protection for the application program; at the same time, it would be convenient for the user to relock an application to a device according to the application device unlocking key.

Other features and advantages of the present invention will be set forth in part in the description which follows and, in part, will be obvious from the description, or may be understood by implementing the invention. The objectives and other advantages of the present invention may be implemented and achieved by the structures indicated particularly in the written description, claims and accompanying drawings.

BRIEF DESCRIPTION OF THE DRAWINGS

The accompanying drawings are used for further illustrating the present invention and constitute a part of the application; the illustrative embodiments of the present invention and the description of the embodiment are used for further explaining the present invention and are not for use in limiting the protection scope thereof. The description of the accompanying drawings is as follows.

DETAILED DESCRIPTION OF THE INVENTION

Function Summary

In the related art, it is not proposed a technical scheme for performing an effective protection for an application program; therefore, an embodiment of the present invention provides an improved scheme for locking an application program; in the technical scheme of an embodiment of the present invention, a first decoding lock generated by a terminal and a second decoding lock generated by a device are used for performing an effective protection for an application program. It should be noted that, the present invention is applicable to all mobile terminals attaching PC side software.

A detailed description of the present invention is provided hereinafter with reference to attached drawings and specific embodiments. It should be understood that, the embodiments offered herein are used for explaining the present invention only and shall not be used for limiting the protection scope of the present invention.

In the following description, for the objective of interpreting, multiple specific details are described for providing a better understanding of the present invention. Obviously, in the case that there is no such specific details, the present invention may also be implemented; in addition, the following embodiments and various details of the following embodiments may be performed in various combinations without departing from the spirit and scope of the invention as defined in the claims.

Method Embodiments

Figure 1:
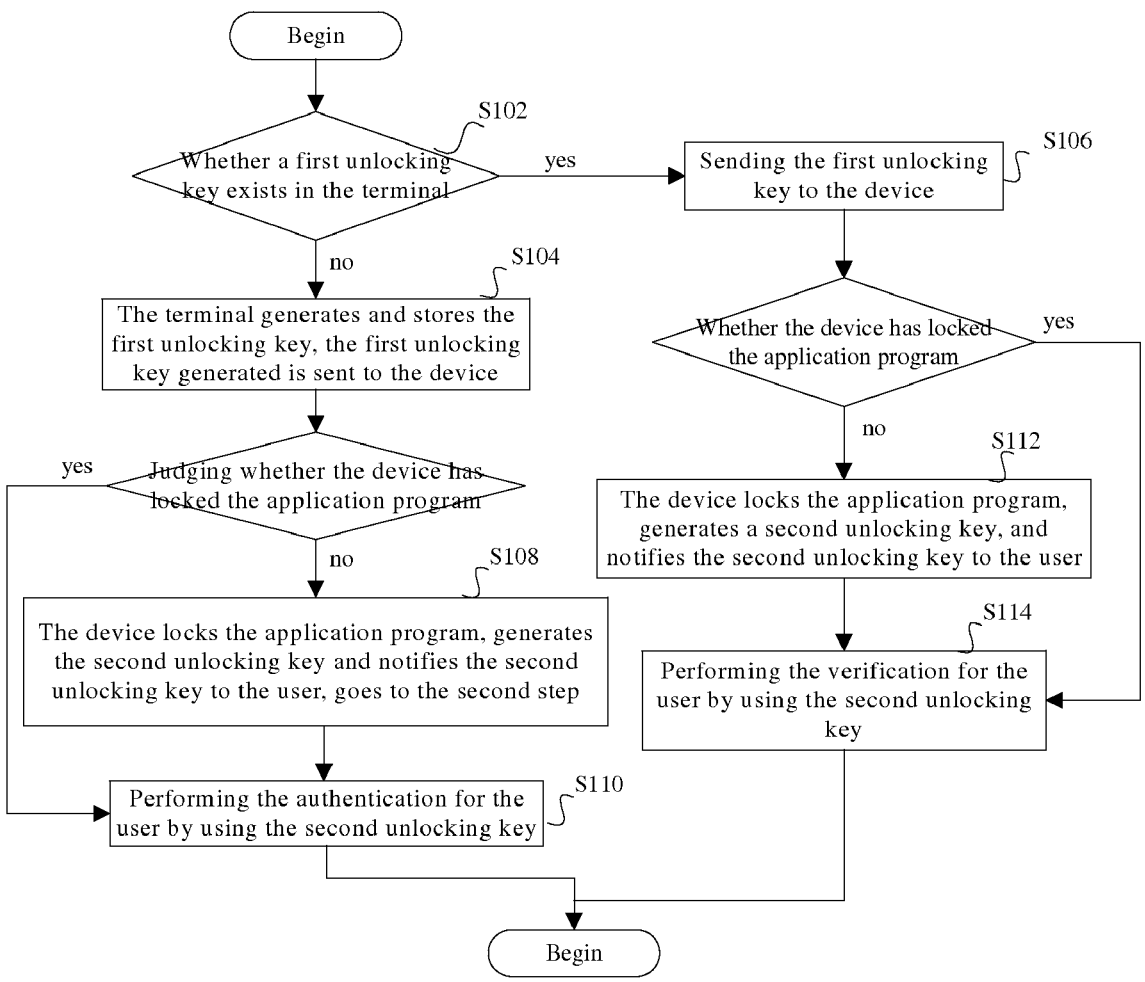
FIG. 1 is a flowchart illustrating a method for locking the application program according to an embodiment of the present invention.

A method for locking an application program is provided according to an embodiment of the present invention. The method is applied in a communication environment including a terminal and a device connected to the terminal. FIG. 1 is a flowchart illustrating a method for locking the application program according to an embodiment of the present invention. As shown in FIG. 1, the method includes the following steps (steps S102-S114):

Step S102: when running the application program stored in the terminal, it is judged whether a first unlocking key of the application program exists in the terminal; in the case that the first unlocking key does not exist, step S104 is executed; in the case that the first unlocking key exists, step S106 is executed;

Step S104: in the case that the first unlocking key does not exist, the terminal generates and stores the first unlocking key, and sends it to the device; it is judged whether the device has locked the application program, in the case that the result of the judgment is no, step S108 is executed, otherwise step S110 is executed;

Step S106: in the case that the first unlocking key exists in the terminal, the first unlocking key is sent to the device, it is judged whether the device has locked the application program, in the case that the result of judgment is no, step S112 is executed, otherwise step S114 is executed;

Step S108: the device locks the application program, generates a second unlocking key, notifies the second unlocking key to the user, and executes step S110; in practical applications, the second unlocking key is generated according to a device vendor secret key, a serial number of application program and a unique identifier of device; the first unlocking key is the second unlocking key encrypted in a predetermined manner;

Step S110: performing an authentication process for the user using the second unlocking key; wherein the authentication processing includes: comparing the second unlocking key inputted by the user with the second unlocking key of the device; it is judged that the authentication for the user is passed in the case that the compared result is that the two match with each other. Moreover, in the case that the authentication for the user is passed, it is allowed for the user to relock the device to the application program. On the other hand, in the case that the number of times of failed authentication for the user reaches a predetermined number, the device is disenabled for a preset time;

Step S112: the device locks the application program, generates the second unlocking key and notifies the second unlocking key to the user, step S114 is executed;

Step S114: performing a verification for the user using the second unlocking key, wherein the verification processing may include: decrypting the first unlocking key according to a predetermined manner, comparing the result of the decryption with the second unlocking key; in the case that the compared result is that the two match with each other, it is judged that the verification for the user is passed.

Preferably, the above terminal may be a computer.

Figure 2:
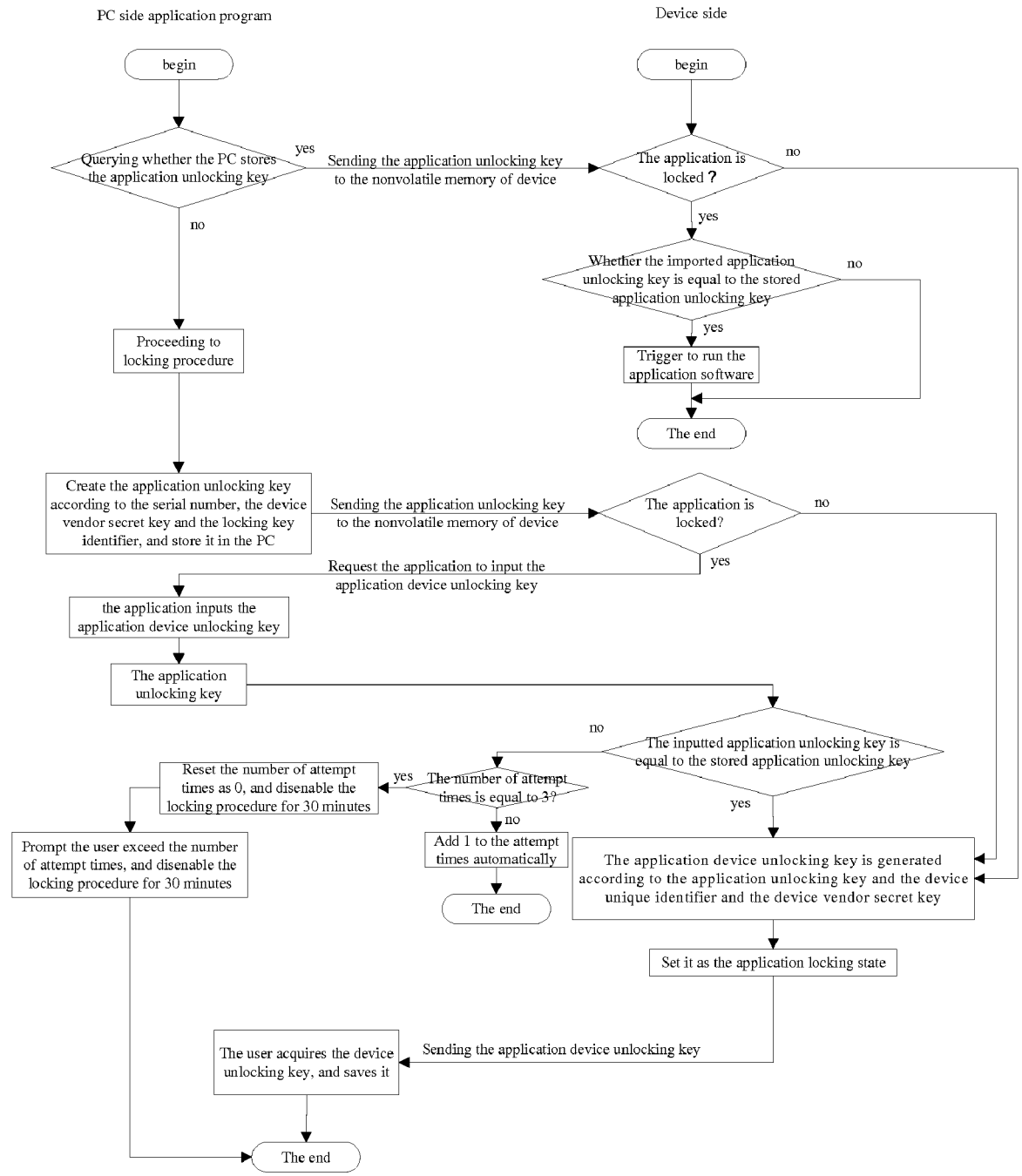
FIG. 2 is a flowchart illustrating a processing example of a method for locking the application program according to an embodiment of the present invention.

The embodiment of the present invention is hereinafter described by taking a computer (personal computer, PC) for example. FIG. 2 is a flowchart illustrating a processing example of a method for locking the application program according to an embodiment of the present invention. As shown in FIG. 2, the method includes the follow steps:

Step one: inputting a serial number when running the PC side software for the first time;

Step two: if an application (program) unlocking key Hash (i.e. the above first unlocking key) is not found in the PC, creating a new unlocking key and setting the new locking key identifier as 1, and then performing a locking process (step three); if an application (program) unlocking key Hash (i.e. the above first unlocking key) is found in the PC, setting the new locking key identifier as 0, and performing a normal operating procedures of the software. In this embodiment, the application unlocking key Hash (i.e. the above first unlocking key) is obtained by a preset encryption algorithm according to a device vendor secret key, a new locking key identifier and a serial number of user software;

Step three: in the process of locking, creating an application unlocking key Hash according to the serial number and the device vendor secret key and the locking key identifier, storing it in the PC, and sending the application unlocking key Hash to the storage media of the device, e.g. nonvolatile memory;

Step four, the next step of locking process: judging whether the device side has locked the application; if the device side has not locked the application, it means that the device is a new device (the device is not locked when it leaves factory, which enables the user to lock it when running the device for the first time); at this time, generating an application device unlocking key Hash (i.e. the above second unlocking key) according to the application unlocking key and the device unique identifier (MAC ID or IMEI) and the device vendor secret key; setting the device as application locking state, and sending the application device unlocking key Hash to the user for preservation; the user may relock the application program to the device using the application device unlocking key;

In step four, if the device side has been at a locking state, it is stated that it is a device having locked an application; at this time, only the original owner of the device (identified by the application device unlocking key) has the unique relocking application rights for the device; the application requests user to input an application device unlocking key, and sends the application device unlocking key Hash saved by the PC side itself to the device side; the device judges the rights of the unlocking key of the application device; if the rights is authenticated, it is stated that the device holder relocks the application; otherwise, it is an illegal user; the application exits after an illegal user attempts the rights authentication for three times; the device can not be used within a period of time, e.g. within 30 minutes (i.e. the above preset time of disenabling the device); afterwards, the device can be enabled again;

Step five: in the normal operation process of the software, a device application unlocking key Hash will be sent; after receiving the device application unlocking key, the device judges the original device application unlocking key of the device. If they are matched, starting up the application normally; otherwise, the startup of the application is failed.

With the above processing of the present invention, application software may be locked to a terminal device.

Preferably, in practical applications, the above methods may be used for judging whether the device is used for the first time. In addition, when the device can be managed by a server via an air interface, the application locking state may be managed by means of the device management (OMA DM) via the air interface. Moreover, the legality of application serial number may be controlled when the device information may be queried by the server via an air interface; once an illegal user performs the network link embezzlement (i.e. the device and the application do not match), the server may find the embezzlement immediately.

In the above embodiment, the term "storage media" may represent one or more apparatuses for storing data, including read only memory (ROM), random access memory (RAM), magnetic RAM, magnetic core memory, disk storage media, optical storage media, flash memory apparatus and/or other machine readable media for storing information. The term "machine readable media" includes, but is not limited to, portable or fixed storage apparatuses, optical storage apparatus, wireless channel or various other media capable of storing, containing or carrying instruction and/or data.

In addition, the embodiment may be implemented by hardware, software, firmware, middleware, microcode, hardware description language or the combination thereof. When it is implemented by software, firmware, middleware or microcode, the codes or code segments for performing the necessary tasks may be stored in the machine readable media such as storage media. (Multiple) processor(s) may perform the necessary tasks. The code segments may represent any combination of process, function, subprogram, program, routine, subroutine, module, object, software package, class, instruction, data structure or program language. The code segment may be coupled to another code segment or hardware circuit by transmitting and/or receiving information, data, independent variable, or storage content. Information, independent variable, parameter and data and etc., may be transferred, transmitted or delivered by any suitable method including memory sharing, messaging, token passing and network transmission, and etc.

Apparatus Embodiment

Figure 3:
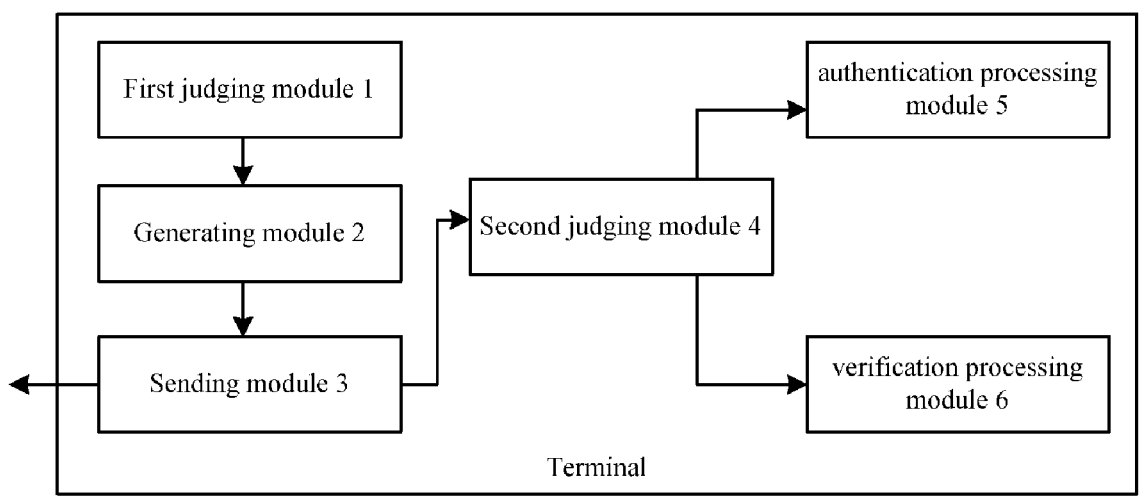
FIG. 3 is a block diagram illustrating a terminal according to an embodiment of the present invention.

In accordance with an embodiment of the present invention, a terminal is provided for implementing the method for locking the application program of the above method embodiment. FIG. 3 is a block diagram illustrating a terminal according to an embodiment of the present invention. As shown in FIG. 3, according to the embodiment of the present invention, the terminal includes a first judging module 1, a generating module 2, a sending module 3, a second judging module 4, an authentication processing module 5, and a verification processing module 6. The above modules are hereinafter described in detail.

Specifically, the first judging module 1 is used for judging whether a first unlocking key of the application program exists in the terminal when running the application program stored in the terminal; in the case that the first judging module 1 judges that the first unlocking key does not exist in the terminal, the generating module 2 of the terminal generates and stores the first unlocking key; afterwards, the sending module 3 sends the generated first unlocking key to a device; in addition, in the case that the first judging module 1 judges that the first unlocking key exists in the terminal, the sending module 3 may send the first unlocking key of the terminal to the device directly; the second judging module 4 is used for judging whether the device has locked the application program; in the case that the device has locked the application program, the authentication processing module 5 performs the authentication process for the user using a second unlocking key; in addition, the verification processing module 6 may also perform the verification processing for the user using the second unlocking key.

The authentication of the authentication processing module 5 includes: comparing the second unlocking key inputted by the user with the second unlocking key of the device, and judging that the authentication for the user is passed in the case that the compared result is that the two match with each other. Moreover, in the case that the authentication for the user is passed, it is allowed for the user to relock the device to the application program. In addition, the verification process of the verification processing module 6 may include: decrypting the first unlocking key according to a predetermined manner, comparing the result of the decryption with the second unlocking key, and judging that the verification for the user is passed in the case that the compared result is that the two match with each other.

Preferably, the above terminal may be a computer.

To sum up, by means of the embodiments of the present invention, the problem that an effective protection is not provided for the software (application program) in the prior art is solved by locking the application program, to prevent an illegal user from performing the network link embezzlement via the PC side software, providing an effective protection for the application program; at the same time, it would be convenient for the user to relock an application to a device according to the application device unlocking key.

The foregoing is only preferred embodiments of the present invention and is not for use in limiting the protection scope thereof, and for those skilled in the art, there may be various modifications and changes to the present invention. Any modification, equivalent replacement and improvement made under the spirit and principle of the present invention should be included in the protection scope thereof.

What is claimed is:

1. A method for locking an application program, applied in a communication environment including a terminal and a device connected to the terminal, comprising:
   judging whether a first unlocking key of the application program exists in the terminal when running the application program stored in the terminal;
   generating and storing, by the terminal, the first unlocking key in the case that the first unlocking key does not exist in the terminal, and sending the generated first unlocking key to the device, judging whether the device has locked the application program, proceeding to step one in the case that the device has not locked the application program;
   otherwise proceeding to step two;
   step one: locking, by the device, the application program, generating a second unlocking key, notifying the second unlocking key to a user, and proceeding to step two;
   step two: performing an authentication process for the user using the second unlocking key;
   sending the first unlocking key to the device in the case that the first unlocking key exists in the terminal, judging whether the device has locked the application program, proceeding to step three in the case that the device has not locked the application program; otherwise, proceeding to step four;
   step three: locking, by the device, the application program, generating a second unlocking key, notifying the second unlocking key to the user, and proceeding to step four;
   step four: performing a verification process for the user using the second unlocking key.

2. The method of claim 1, wherein the authentication process comprises:
   comparing the second unlocking key inputted by the user with the second unlocking key of the device, and judging the authentication for the user is passed in the case that the compared result is that the two match with each other.

3. The method of claim 2, wherein the user is allowed to relock the device to the application program in the case that the authentication for the user is passed.

4. The method of claim 2, wherein further comprising: disenabling the device for a preset time in the case that the number of times of failed authentication for the user reaches a predetermined number.

5. The method of claim 1, wherein the second unlocking key is generated according to a device vendor secret key, a serial number of the application program and a unique identifier of the device; the first unlocking key is the second unlocking key encrypted in a predetermined manner.

6. The method of claim 5, wherein the verification process comprises:
   decrypting the first unlocking key according to the predetermined manner, comparing the result of the decryption with the second unlocking key; judging the verification for the user is passed in the case that the compared result is that the two match with each other.

7. The method of claim 1, wherein the terminal is a computer.

8. A terminal, comprising:
   a first judging module for judging whether a first unlocking key of an application program exists in the terminal when running the application program stored in the terminal;
   a generating module for generating and storing the first unlocking key in the case that the first judging module judges that the first unlocking key does not exist in the terminal;
   a sending module for sending the generated first unlocking key to a device;
   a second judging module for judging whether the device has locked the application program;
   an authentication processing module for performing an authentication process for a user using the second unlocking key in the case that the result of judgment of the second judging module is yes
   a verification processing module for performing a verification process using the second unlocking key in the case that the result of judgment of the second judging module is yes.

9. The terminal of claim 8, wherein the terminal is a computer.

10. The method of claim 2, wherein the second unlocking key is generated according to a device vendor secret key, a serial number of the application program and a unique identifier of the device; the first unlocking key is the second unlocking key encrypted in a predetermined manner.

11. The method of claim 3, wherein the second unlocking key is generated according to a device vendor secret key, a serial number of the application program and a unique identifier of the device; the first unlocking key is the second unlocking key encrypted in a predetermined manner.

12. The method of claim 4, wherein the second unlocking key is generated according to a device vendor secret key, a serial number of the application program and a unique identifier of the device; the first unlocking key is the second unlocking key encrypted in a predetermined manner.

13. The method of claim 2, wherein the terminal is a computer.

14. The method of claim 3, wherein the terminal is a computer.

15. The method of claim 4, wherein the terminal is a computer.

* * * * *